United States Patent [19]

Ward

[11] Patent Number: 4,524,986
[45] Date of Patent: Jun. 25, 1985

[54] SPLASH GUARD

[75] Inventor: Douglas K. Ward, Toronto, Canada

[73] Assignee: Powerflow, Inc., Buffalo, N.Y.

[21] Appl. No.: 544,358

[22] Filed: Oct. 21, 1983

[51] Int. Cl.³ .............................................. B62D 25/16
[52] U.S. Cl. .............................. 280/154.5 R; 411/120
[58] Field of Search .................... 280/153 R, 154.5 R; 411/112, 119, 120, 121

[56] References Cited

U.S. PATENT DOCUMENTS

| | | |
|---|---|---|
| 2,760,540 | 8/1956 | Houpitch . |
| 2,775,010 | 12/1956 | Bedford, Jr. . |
| 2,888,971 | 6/1959 | Wootton . |
| 2,916,115 | 12/1959 | Van Niel et al. . |
| 2,974,383 | 3/1961 | Bright . |
| 3,189,077 | 6/1965 | Willis, Jr. et al. . |
| 3,953,053 | 4/1976 | Arenhold ............ 280/154.5 R |
| 4,011,636 | 3/1977 | Malacheski ............ 24/137 R |
| 4,012,053 | 3/1977 | Bode ............ 280/154.5 R |
| 4,089,537 | 5/1978 | Pralutsky ............ 280/154.5 R |
| 4,099,736 | 7/1978 | Shiina ............ 280/154.5 R |
| 4,174,850 | 11/1979 | Hart ............ 280/153 |
| 4,264,083 | 4/1981 | Matthew et al. ............ 280/154.5 R |
| 4,293,140 | 10/1981 | Bell et al. ............ 280/154.5 R |
| 4,408,939 | 10/1983 | Graff et al. ............ 411/112 |

OTHER PUBLICATIONS

Tinnerman Catologue, pp. J-1 thru U-19, 1953.
Tinnerman SPAE-NAUR Products, 1977.
"Rubber Queen" rubber Splash Guards–Installation Catolog.

Primary Examiner—Joseph F. Peters, Jr.
Assistant Examiner—Donn McGiehan
Attorney, Agent, or Firm—Watts, Hoffmann, Fisher & Heinke

[57] ABSTRACT

A splash guard assembly including a splash guard 10 and mounting clamps 16 for attaching the splash guard to a fender flange 12b. The mounting clamp 16 includes structure defining a base 22, a back plate 24 extending laterally from the base and a pair of substantially parallel clamping arms 26 disposed on either side of the back plate. The clamping arms also extend from the base 22 and include portions disposed in a plane spaced from a plane defined by the back plate such that a fender flange receiving gap 28 is defined. Portions of the arms 26 are biased toward the plane of the back plate 24 so that when the clamp is pushed onto the fender flange a gripping force is generated by which the clamp is held in position during the installation process. A threaded pin member 18 is carried by the clamp and receives the splash guard. A locking cap is threaded onto the pin 18 in order to secure the splash guard to the clip and to generate a clamping force by urging the clamping arms 26 towards the back plate so that once installed, the mounting clip is maintained on the fender flange by the clamping force generated by the threaded cap.

7 Claims, 7 Drawing Figures

SPLASH GUARD

DESCRIPTION

1. Technical Field

The present invention relates generally to vehicle splash guards and in particular to an improved apparatus for mounting a splash guard to a vehicle fender.

2. Background Art

For many years vehicle splash guards have been mounted behind tires of vehicles and have operated to contain or control spray generated as the tires travel through water and slush on a roadway. In the past, splash guards were commonly mounted to trucks or other vehicles having exposed tires and were primarily for the benefit of other vehicles and pedestrians.

Splash guards for automobiles have now become popular especially in those areas of the country that experience severe winters. The primary function of splash guards mounted to automobiles is to prevent road material such as salt or rocks, cast off by tires, from impinging on vehicle bodies. In the absence of splash guards, the material striking the body work gradually abrades the paint eventually precipitating rust in the body panels adjacent the wheel opening.

Since splash guards are normally not standard equipment when an automobile is purchased, they are usually installed by or for the owner after purchase. The splash guards are generally mounted behind the front and rear wheels and are attached to structure forming part of the wheel opening in the fender. In most automobiles, the wheel opening is defined by a rigidizing flange or lip that is bent inwardly toward the centerline of the automobile. In a typical splash guard installation, the splash guard is fastened to a portion of this rigidizing flange.

Various methods and apparatus for attaching a splash guard to a fender flange have been proposed. One of the most common methods is the use of threaded fasteners which extend through a splash guard and threadedly engage apertures formed in a flange. This method is disliked by many car owners because it requires a drilling step (and attendant drilling equipment) to drill the holes in fender flanges. It is believed that the holes themselves may precipitate rust and corrosion in fender flanges.

Devices for attaching the splash guard to the fender flange have also been proposed which obviate the need for the apertures in the flange. One of these proposed devices is illustrated in U.S. Pat. No. 4,293,140. The suggested device comprises a Z-shaped metal clip defining two interconnected U-shaped portions. One U-shaped portion frictionally engages the fender flange, while the other portion engages a splash guard. Another proposed device is illustrated in U.S. Pat. No. 4,264,083 for which a reexamination certificate was issued on Mar. 22, 1983. The device disclosed in this patent comprises a U-shaped clip engageable with a fender flange that carries an outwardly extending pin. A retaining cap installed onto the pin maintains a splash guard on the clip.

Both of these proposed devices are similar in that they rely on the resiliency of the clip itself to maintain the engagement with the fender flange. It is believed that in use, large objects cast off by the tire which strike the splash guard can easily dislodge the clips from the fender flange. External forces applied to the splash guard, i.e. by a car wash, snow buildup, etc. could also dislodge the splash guard. In addition, it is believed that as the clip ages, fatigue in the material reduces the resiliency of the clip and hence the gripping force by which the clip maintains the fender engagement. As a result, the clip eventually releases causing the disengagement of the splash guard from the fender. Moreover, since the engagement is dependent solely on the resiliency of the clip, the fender thickness over which the clip is inserted will determined the final gripping force.

DISCLOSURE OF INVENTION

The present invention provides a new and improved splash guard assembly that includes a splash guard mounting device that does not rely on inherent resiliency to maintain the engagement of the device with the fender flange.

According to the invention, the device includes structure defining a support base and clamping elements extending from the base which are operative to clampingly engage a fender lip or flange. In a preferred embodiment, the clamping elements include a pair of substantially parallel arms disposed on either side of a back plate. At least portions of the arms are each disposed in a plane spaced from a plane of the back plate so that a gap is defined between the arms and the back plate for receiving the fender lip.

According to the preferred and illustrated embodiment, the back plate forms a lateral extension of the base and is coplanar therewith. The arms include interconnecting portions that diverge away from the plane of the base to define the flange receiving gap and then diverge in a lateral direction with respect to the base so that at least portions of each arm are disposed in a plane spaced from the plane of the back plate. Preferably, a region near the end of each arm intersects the plane of the back plate so that the arms are resiliently biased towards the fender lip when the clamp is installed. With the preferred construction, the clamp is maintained in position during installation by the clamping force generated when the clamping arms are spread in a direction away from the back plate, in order to receive the flange.

In the preferred embodiment, a threaded member is carried by, and extends outwardly from, the clamp which serves as a means for mounting the splash guard to the clamp and hence to the fender flange. The threaded pin extends through the splash guard and threadedly engages a locking element which abuts the other side of the splash guard so that the splash guard is clamped onto the threaded pin between the clamp and the locking element.

According to a feature of the invention, the pin is carried by the base and/or the back plate and extends through the plane of the clamping arms. With this preferred arrangement, when the splash guard is mounted and the lock element threaded onto the pin, the back plate and arms are drawn towards each other so that a clamping force between these elements is generated. Thus when the installation of the splash guard is completed, the mounting clamp is rigidly secured to the fender flange and maintained by an external clamping force generated by the engagement between the threaded member and the locking element. Unlike the prior art, the resiliency of the mounting clamp is not relied upon to maintain the engagement to the fender flange.

According to a feature of the invention, the base also includes an abutment that contacts a portion of the splash guard and enhances the overall engagement of the mounting clamp with the fender flange. In the preferred and illustrated construction, the abutment comprises a downturned lip formed on one edge of the base, spaced from the back plate which contacts a portion of the splash guard disposed on the other side of the threaded pin. As the locking element is tightened on to the threaded pin the contact between the abutment and the splash guard causes the portion of the splash guard adjacent the fender flange to rotate towards the clamping arms thus increasing the clamping force exerted by the arms and back plate.

According to another feature of the invention, barbs are formed on each of the clamping arms and on the back plate which are arranged to contact the fender flange when the clamp is mounted. The barbs formed on the clamping legs resist rotation of the mounting clamp relative to the fender flange when the locking element is being installed or removed. In order to facilitate insertion of the mounting clamp onto the fender flange, the extreme ends of the clamping arms are bent outwardly, away from the plane of the back plate so that a ramp-like surface is presented to the edge of the flange as the clamp is pushed into position. The ramp-like surface causes the arms to move in a direction away from the back plate as the mounting clamp is inserted onto the flange.

In one disclosed embodiment, a threaded pin comprises a threaded screw which is held in position on to the base by a resilient tongue formed integrally with the base and which includes a downturned lip that engages a slot in the head of the fastener. The tongue not only maintains the position of the fastener in the clamp but also prevents relative rotation of the fastener by virtue of the engagement between the downturned lip and fastener slot. It should be noted that other arrangements for maintaining a threaded pin to the mounting clamp are also contemplated. With the disclosed construction, however, the splash guard installer, depending on his preference, can either mount the splash guard directly to the fender flange using only the threaded fastener (after drilling appropriate holes in the flange) or else use the mounting clamp to attach the splash guard to the fender flange and avoid a need for drilling holes in the flange.

It should be apparent that the present invention provides an efficient and yet inexpensive method for attaching a splash guard to an automobile fender flange. Unlike the prior art, the mounting clamp does not rely on resiliency to maintain its engagement with the fender flange. Instead, the clamping force, generated when the splash guard is secured to the mounting clamp, operates to maintain the engagement between the mounting clamp and the fender flange. The construction of the disclosed mounting clamp is readily manufacturable and inexpensive. The clamp itself can be constructed as a sheet metal stamping requiring little if any additional machining.

Additional features of the invention will become apparent and a fuller understanding obtained in reading the following detailed description made in connection with the accompanying drawings.

BEST MODE FOR CARRYING OUT THE INVENTION

Figure 1:
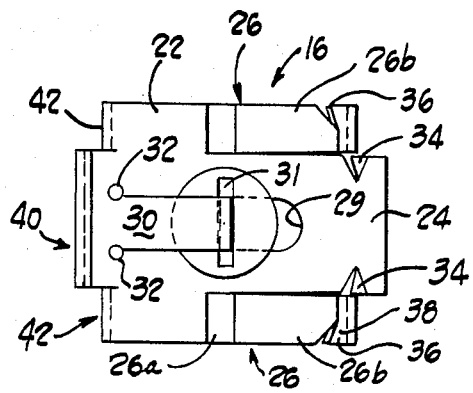
FIG. 1 is a side elevational view of a splash guard mounting clip constructed in accordance with the preferred embodiment of the invention.
Figure 2:
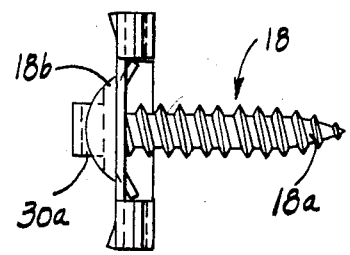
FIG. 2 is an end view of the mounting clamp.
Figure 3:
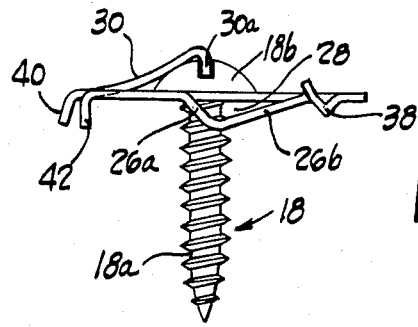
FIG. 3 is another end view of the mounting clamp.
Figure 5:
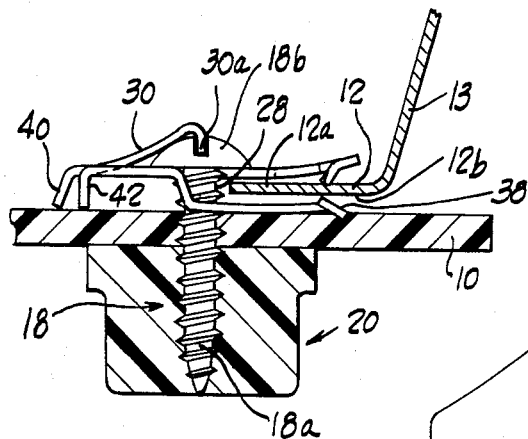
FIG. 5 is an enlarged sectional view as seen from the plane indicated by the line 5—5 in FIG. 4.
Figure 4:
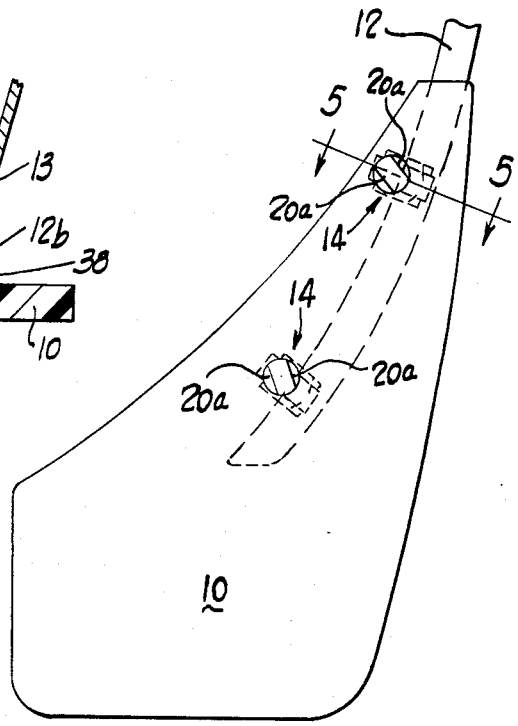
FIG. 4 illustrates a splash guard attached to a fender well flange utilizing the mounting arrangement of the present invention.

The overall construction of a splash guard assembly embodying the present invention is best seen in FIGS. 4 and 5. The assembly includes a conventional splash guard 10 attached to a fender flange or lip 12 that defines a wheel opening in an automobile fender 13. A splash guard 10 is attached to the flange 12 by mounting devices, indicated generally by the reference character 14, constructed in accordance with the preferred embodiment of the invention. Referring also to FIGS. 1-3, the mounting apparatus 14 comprises a flange engaging clamp 16, a splash guard supporting pin member 18, carried by the clamp and a splash guard lock element 20 (shown best in FIG. 5) engageable with the pin member 18 and operative to secure the splash guard onto the pin member.

Figure 6:
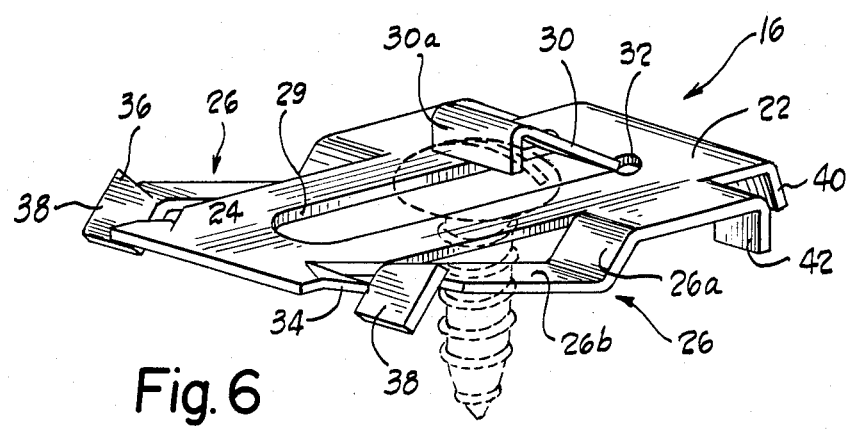
FIG. 6 is an enlarged perspective view of the mounting clamp.
Figure 7:
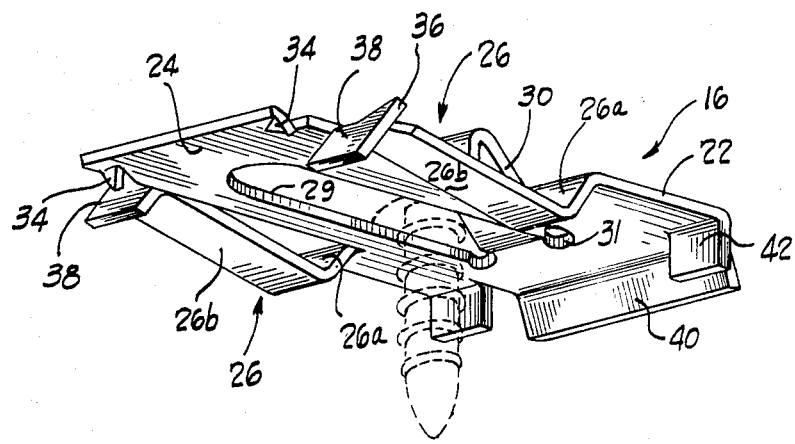
FIG. 7 is another enlarged perspective view showing the underside of the mounting clamp.

Referring also to FIG. 6 and 7, the splash guard clamp 16 includes structure defining a base 22, a back plate 24 extending laterally from the base 22 and a pair of substantially parallel clamping arms 26 disposed on either side of the back plate 24. In the preferred and illustrated embodiment, the back plate 24 extends from and is coplanar with the base 22. The arms 26, on the other hand, include an interconnecting portion 26a that diverges downwardly with respect to the plane of the back plate 24 before joining with a lateral extending segment 26b of each arm. The interconnecting segment 26a and the lateral segment 26b define a somewhat L-shaped configuration. It should be noted that the reverse geometry of that shown could be used, i.e., the arms 26 could extend laterally and be coplanar with the base 22 while the back plate would include a diverging segment.

As seen best in FIG. 3, the diverging segment of the arms 26 defines a gap 28 between the back plate 24 and the arms 26. Referring to FIG. 5, when the clamp 16 is installed, the fender flange 12 is received in the gap 28.

In the preferred embodiment and as best seen in FIG. 3, the lateral extending segments 26b of the arms 26 extend toward and intersect the plane of the back plate 24. The base 22, back plate 24 and clamping legs 26 are preferably formed as part of a resilient sheet metal stamping. In this preferred embodiment, when the clamping arms 26 are displaced away from the back plate 24 in order to receive a fender flange 12, a clamping force is generated which tends to maintain engagement between the clamp 16 and the fender flange 12, during installation of the splash guard.

The pin member 18 extends orthogonally from the plane of the base 22. In one embodiment, the pin 18 comprises a self-tapping screw defined by a threaded shank 18a and a head 18b including a slot 31. The base 22 and back plate 24 define an opening 29 through which the shank 18a extends. In this embodiment, the base defines a resilient tongue 30 including a downturned lip 30a which overlies a portion of the head 18b and engages the slot 31. A pair of spaced apertures 32 define the bending axis of the tongue. With this construction, the tongue 30 secures the threaded fastener to the base and the lip 30a resists rotation of the fastener 18 during the splash guard installation.

The splash guard is secured to the fastener 18 by the lock element 20 which is threadedly engageable with the fastener 18. The lock element 20 may be constructed of any suitable material such as plastic and preferably includes a pair of spaced apart flats 20a for engagement by a tool such as a wrench.

In order to facilitate installation of the splash guards, barbs 34, 36 are formed on the back plate 24 and clamping arms 26, respectively, as seen best in FIGS. 1 and 6. The barbs 34, 36 are directed towards respective inside and outside surfaces 12a, 12b of the fender flange 12. In addition, the distal ends of the clamping arms 26 are bent downwardly, as viewed in FIG. 3, to define a beveled or ramp-like surface 38. With this preferred construction, separation of the arms 26 to accept the fender flange 12 is facilitated as the clamp 16 is pushed onto the flange 12. In short, the contact between the beveled surface 38 and the flange drives the clamping arms away from the back plate 24.

The purpose of the barbs formed on the back plate and clamping arms is to resist rotation of the clamp 16 relative to the fender flange 12 as the lock 20 is tightened onto or removed from the shank 18a of the fastener 18. In essence, the barbs enhance the engagement between the mounting clamp 16 and the fender flange 12 so that installation of the splash guard is expedited.

In accordance with the invention, the clamping force generated by the resilient clamping arms 26 is utilized during installation only. Unlike the prior art, an external, positive clamping force maintains the mounting clamp 16 to the fender flange 12 during normal use. As seen best in FIG. 5, the splash guard 12 is positioned on the threaded shank 18a intermediate the clamping arms 26 and the threaded lock 20. It should be apparent that as the lock 20 is threaded onto the shaft a clamping force is generated which urges the splash guard towards the clamp arms 26. Since the head 18b of the fastener 18 is carried by the base 22 and/or the back plate 24, as the lock element 20 is tightened the splash guard 10, the clamping arms 26, and the back plate 24 are urged or squeezed together. In effect, the back plate 24 and clamping arms 26 are urged towards each other thus increasing the gripping force applied by the back plate and clamping arms to the fender flange 12.

To further enhance the engagement of the clamp 16 with the fender flange 12, the base includes a down-turned flange 40 (as viewed in FIG. 5) the edge of which abuts the splash guard 10. The contact between the flange 40 and the splash guard during installation causes the portion of the splash guard to the right of the shaft 18a to pivot towards the fender flange 12 thus increasing the clamping force. The flange 40 also serves another purpose. During installation, it provides an abutment against which the installer pushes in order to install the clamp onto the fender.

In the illustrated embodiment, spaced marginal flanges 42 are also formed on either side of the abutment 40. In some installations, the marginal flanges 42 serve to pivot the splash guard as described above. Alternately, these marginal flanges can be coincident with the abutment 40 so that the left edge, as viewed in FIG. 1, of the mounting clamp would be uniform.

It should be understood that the tongue 30 for maintaining the threaded screw 18 in position could be replaced by other structure. In addition, other types of threaded fasteners could be employed to serve as the pin member 18. For other types of fasteners, the base would be modified to include structure engageable with the fastener to maintain its position on the base as well as resist rotation during installation.

With the illustrated embodiment however, standard, commercially available fasteners are used as the threaded member, reducing the overall expense of the splash guard assembly. In addition, the purchaser of a splash guard has the option of installing the splash guard directly to the fender flange utilizing the threaded fasteners alone.

Although the invention has been described with a certain degree of particularity, it should be understood that various changes can be made to it by those skilled in the art without departing from the spirit or scope of the invention as hereinafter claimed.

I claim:
1. A clamp for mounting a splash guard to a vehicle fender, comprising:
   (a) structure defining a primary support base including a laterally extending back plate means;
   (b) spaced apart clamping arms disposed on either side of said back plate means each of said arms including a portion depending away from a plane defined by said back plate means such that a fender receiving gap is defined between said back plate means and portions of said clamping arms;
   (c) pin means carried by said base, said base including structure for preventing rotation in said pin means;
   (d) lock means engageable with said pin means and including means for urging said clamping legs towards the plane of said back plate means such that a clamping force is applied to a fender received between said back plate means and said clamping arms when said lock means is installed.

2. The apparatus of claim 1 wherein each clamping arm includes fender gripping means for resisting relative rotation between said fender and said clamp as said locking means is installed on said pin means.

3. The apparatus of claim 1 wherein said pin means comprises a threaded fastener including a head defining a slot and said base includes a tongue for maintaining said fastener to said center section and for preventing rotation of said fastener relative to said base.

4. A splash guard assembly securable to a vehicle fender, comprising:
   (a) a flexible splash guard defining a portion attachable to a flange of a vehicle fender;
   (b) a plurality of mounting clamps for attaching said portion to said fender flange;
   (c) each of said clamps including structure defining a support base having a laterally extending back plate means;
   (d) spaced apart clamping arms disposed on either side of said back plate means, said arms including arm portions disposed in a predetermined plane, spaced from another plane defined by said back plate means such that a fender receiving gap is defined by said arm portions and said back plate means;
   (e) clamping force generating means including structure for receiving said splash guard portion;
   (f) said splash guard portion including structure engageable with said receiving structure;

(g) said clamping force generating means including locking means for maintaining engagement with said splash guard portion.

5. The assembly of claim 4 wherein said clamping force generating means comprises a threaded fastener and said locking means comprises a cap threadedly engageable with said fastener, said back plate means including means for preventing rotation of said threaded fastener when said locking means is installed.

6. The assembly of claim 4 wherein said splash guard structure engageable with said clamping force generating means comprises apertures.

7. The assembly of claim 6 wherein said apertures are formed in the splash guard portion by the installer during installation of the splash guard assembly.

* * * * *